United States Patent
Park et al.

(10) Patent No.: US 7,693,556 B2
(45) Date of Patent: Apr. 6, 2010

(54) KEY INPUT METHOD IN A MOBILE TELECOMMUNICATION TERMINAL

(75) Inventors: Seong-Min Park, Kumi-shi (KR); Kwon-Tae Kim, Kumi-shi (KR)

(73) Assignee: Samsung Electronics Co., Ltd (KR)

( * ) Notice: Subject to any disclaimer, the term of this patent is extended or adjusted under 35 U.S.C. 154(b) by 1746 days.

(21) Appl. No.: 09/775,529

(22) Filed: Feb. 1, 2001

(65) Prior Publication Data

US 2001/0012790 A1 Aug. 9, 2001

(30) Foreign Application Priority Data

Sep. 2, 2000 (KR) ................ 2000-51867

(51) Int. Cl.
*H04M 1/00* (2006.01)
(52) U.S. Cl. ............... 455/575.1; 455/90.1; 455/550.1
(58) Field of Classification Search ............ 455/564, 455/575.1–575.6, 90.1–90.3, 566, 550.1, 455/422; 345/156, 160, 684, 169, 685
See application file for complete search history.

(56) References Cited

U.S. PATENT DOCUMENTS

| | | | | |
|---|---|---|---|---|
| 5,627,531 A | * | 5/1997 | Posso et al. ............. | 345/184 |
| 5,633,657 A | * | 5/1997 | Falcon ..................... | 345/157 |
| 5,758,295 A | * | 5/1998 | Ahlberg et al. .......... | 379/396 |
| 5,761,610 A | * | 6/1998 | Sorensen et al. ......... | 455/558 |
| 5,786,819 A | * | 7/1998 | Weiser et al. ............ | 345/902 |
| 6,052,115 A | * | 4/2000 | Gregg et al. ............. | 345/159 |
| 6,125,287 A | * | 9/2000 | Cushman et al. ........ | 455/575.1 |
| 6,128,012 A | * | 10/2000 | Seidensticker et al. .... | 345/685 |
| 6,161,026 A | * | 12/2000 | Uchida .................... | 455/566 |
| 6,362,814 B1 | * | 3/2002 | Aizawa .................... | 345/169 |
| 6,580,928 B1 | * | 6/2003 | Aoki ....................... | 455/90.1 |
| 6,628,970 B2 | * | 9/2003 | Nishiyama et al. ....... | 455/564 |

(Continued)

FOREIGN PATENT DOCUMENTS

CN 1139868 A 8/1997

(Continued)

OTHER PUBLICATIONS

Chinese First Office Action dated Jul. 11, 2003 issued in a counterpart application, namely, Appln. No. 01111256.5.

*Primary Examiner*—Lana N Le
(74) *Attorney, Agent, or Firm*—The Farrell Law Firm, LLP

(57) ABSTRACT

A key input method for diversifying key functions in a mobile telecommunication terminal. The method according to the present invention includes the steps of detecting whether or not a user has inputted a key, detecting whether or not the user has consecutively inputted the same key before elapse of a predetermined time, and if so, performing a function newly set according to the consecutive input of the same key. The method further includes the steps of detecting whether or not the user has inputted a key set for a scroll function, and if so, detecting whether or not the key input state of the corresponding key is maintained for a predetermined period of time, and controlling a cursor positioned at a particular item of a menu screen displayed according to a maintenance of the key input state for the predetermined period of time to be positioned at a next menu item in an opposite direction.

4 Claims, 5 Drawing Sheets

U.S. PATENT DOCUMENTS

| | | | |
|---|---|---|---|
| 6,662,025 B1* | 12/2003 | Bond et al. | 455/565 |
| 6,839,417 B2* | 1/2005 | Weisman et al. | 455/575.1 |
| 6,956,591 B2* | 10/2005 | Lundin et al. | 345/684 |
| 7,065,387 B2* | 6/2006 | Engstrom | 455/566 |
| 7,092,495 B2* | 8/2006 | Kraft et al. | 455/550.1 |
| 2002/0040475 A1* | 4/2002 | Yap et al. | 725/39 |
| 2002/0098811 A1* | 7/2002 | Fukuzato | 455/90.1 |
| 2002/0135565 A1* | 9/2002 | Gordon et al. | 345/169 |
| 2004/0077381 A1* | 4/2004 | Engstrom | 455/566 |
| 2004/0204832 A1* | 10/2004 | Han | 340/990 |
| 2004/0253978 A1* | 12/2004 | Horiguchi | 455/550.1 |
| 2005/0104851 A1* | 5/2005 | Hu et al. | 345/157 |
| 2005/0250030 A1* | 11/2005 | McStravick et al. | 455/90.1 |
| 2006/0044277 A1* | 3/2006 | Fux et al. | 345/168 |
| 2009/0176532 A1* | 7/2009 | Chae et al. | 455/566 |

FOREIGN PATENT DOCUMENTS

| | | |
|---|---|---|
| CN | 1192003 A | 2/1998 |
| WO | WO 99/65212 | 12/1999 |

* cited by examiner

KEY INPUT METHOD IN A MOBILE TELECOMMUNICATION TERMINAL

PRIORITY

This application claims priority to an application entitled "Key Input Method in a Mobile Telecommunication Terminal" filed with the Korean Industrial Property Office on Sep. 12, 2000 and assigned Serial No. 00-51867, the contents of which is hereby incorporated by reference.

BACKGROUND OF THE INVENTION

1. Field of the Invention

The present invention relates to a key input method in a mobile telecommunication terminal, and in particular, to a key input method for diversifying key functions in a mobile telecommunication terminal.

2. Description of the Related Art

Devices for satisfying portability by a user or requiring small size such as a mobile telecommunication terminal necessitate a compact and simplified size and construction of the key pads for inputting Arabic numerals or characters. Accordingly, ten digit keys and other several functional keys are basically provided at the maximum in a mobile telecommunication terminal.

By contrast, diverse additional functions of a mobile telecommunication terminal tend to be in steady development, and thus diverse key input methods are introduced to perform different functions with the limited keys.

Nevertheless, diversification of the key functions, which can be input within the key input period of time, has failed to meet the needs of functional keys for many diverse additional functions. As a consequence, a key input method is needed to avail the conventional limited number of keys to perform more diverse functions.

SUMMARY OF THE INVENTION

It is, therefore, an object of the present invention to provide a key input method for realizing diverse key functions according to the diversification of the functions in a mobile telecommunication terminal. To achieve the above object, there is provided a key input method for diversifying key functions in a mobile telecommunication terminal, comprising the steps of: detecting whether or not any key has been inputted by a user; if so, detecting whether or not the inputted key is consecutively re-inputted before elapse of a predetermined period of time for consecutive input; and if so, performing a newly set function according to a consecutive input of the particular key.

There is also provided a key input method for diversifying key functions in a mobile telecommunication terminal, comprising: a first step of detecting whether or not the key set for a scroll function has been inputted by a user when displaying a menu screen consisting of the scroll screen; if so, a second step of detecting whether or not the corresponding key input state is maintained for a predetermined period of time; and a third step of controlling a cursor positioned at a particular item of the displayed menu screen for positioning at the next item in an opposite direction depending on whether or not the corresponding key input state is maintained for a predetermined period of time.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
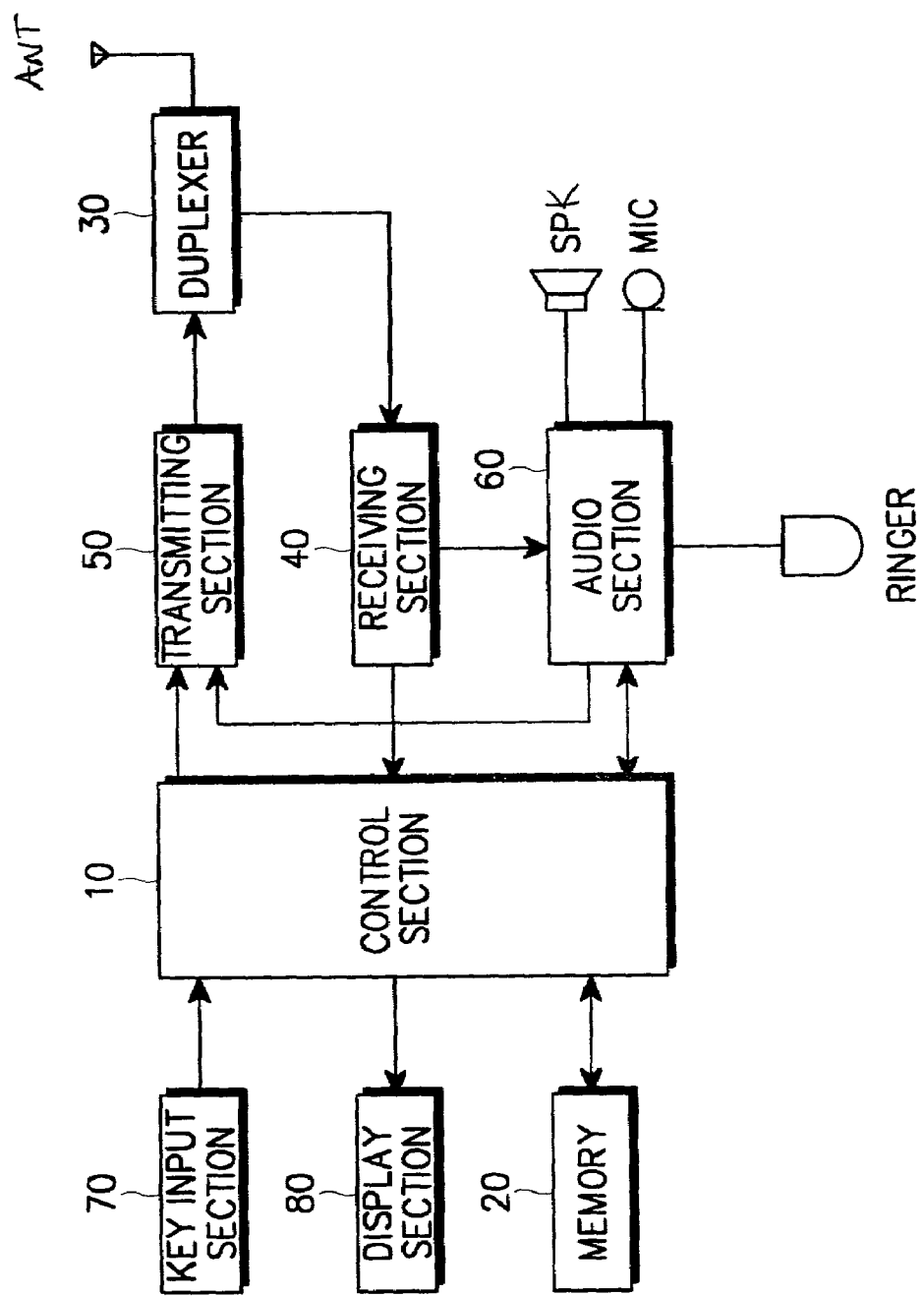
FIG. 1 is a block diagram illustrating a construction of a mobile telecommunication terminal, to which an embodiment of the present invention is applied.

FIG. 1 is a block diagram illustrating a construction of a mobile telecommunication terminal, to which an embodiment of the present invention is applied. Referring to FIG. 1, a control section 10 controls an overall operation of the mobile telecommunication terminal.

A memory 20 stores a predetermined program for controlling an overall operation of the mobile telecommunication terminal as well as data, which are inputted and outputted when the overall operation of the mobile telecommunication terminal is performed by the control section 10, in a pre-set region. A duplexer 30 communicates with a base station through antenna ANT, and separates signals transmitted and received. A receiving section 40 receives wireless signals inputted through the antenna ANT under a predetermined control so as to amplify feeble signals for filtering and outputting the amplified signals. A transmitting section 50 filters and amplifies wireless signals outputted from an audio section 60, which will be described later, under a predetermined control to transmit the amplified signals through the duplexer 30 and the antenna ANT. The audio section 60 modulates voice signals inputted through a microphone MIC to wireless signals under control of the control section 10, and demodulates wireless signals received by the receiving section 40 to transmit the same as voice signals to a speaker SPK. The audio section 60 also detects a ring signal, when generated by the base station, through the receiving section 40, and transmits the same through a ringer. A key input section 70 comprising a number of numeric keys generates key data corresponding to the keys inputted by a user, and outputs the same to the control section 10. A display section 80 including a liquid crystal display (LCD) for displaying diverse information is controlled by the control section 10, and displays key data generated by the key input section and diverse information signals generated by the control section 10 upon receipt of the same.

Figure 2:
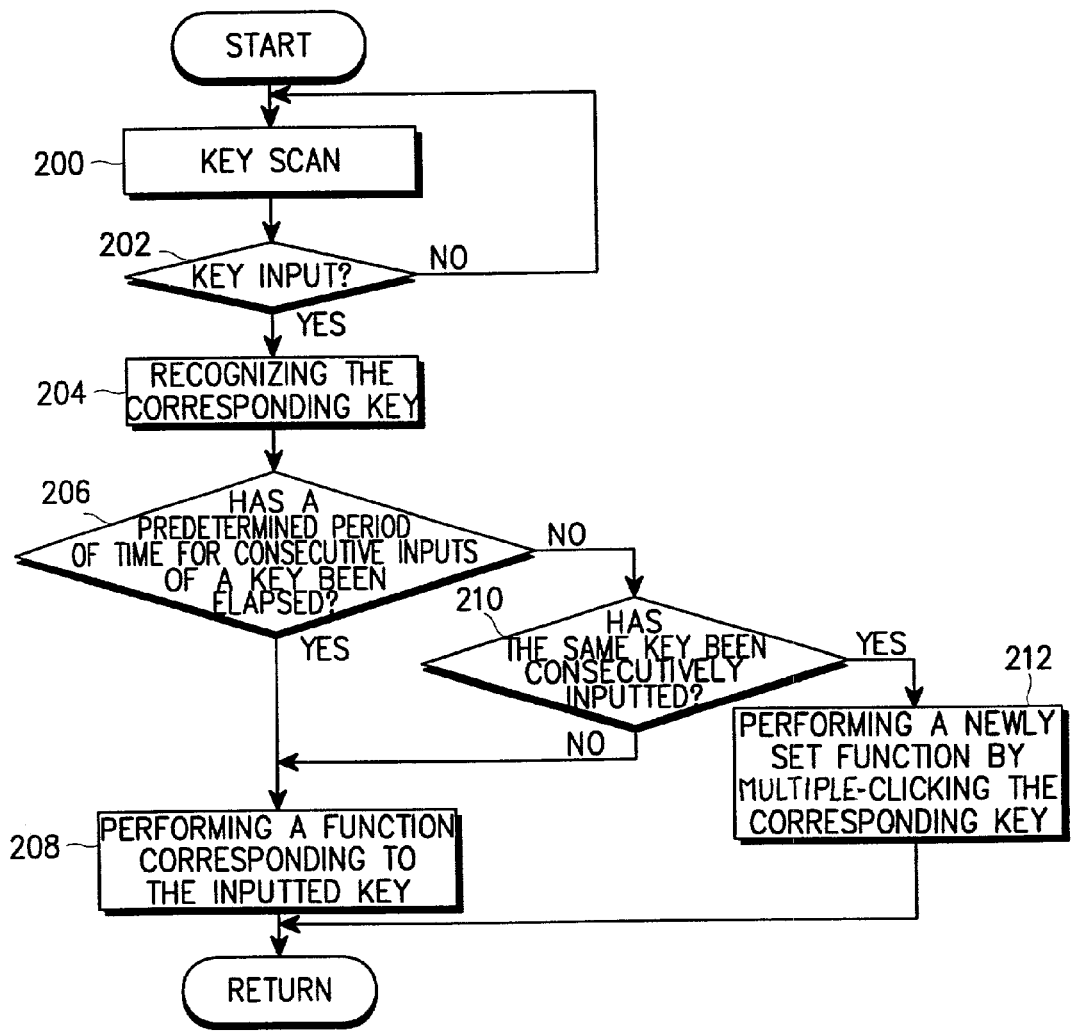
FIG. 2 is a flow chart illustrating a control of key operations depending on consecutive inputs of a key according to an embodiment of the present invention.

FIG. 2 is a flow chart illustrating a control of key operations depending on consecutive inputs of a key according to an embodiment of the present invention. An embodiment of the present invention will now be described in detail with reference to FIGS. 1 and 2.

A user of the mobile telecommunication terminal manipulates diverse keys provided with the telecommunication terminal to perform desired functions in the terminal. Therefore, the control section 10 of the mobile telecommunication terminal according to an embodiment of the present invention detects whether or not the user has inputted any keys through the key input section 70 in step 200.

Upon determination that the user has inputted a particular key, the control section 10, in response thereto in step 202, proceeds with step 204, and recognizes the inputted key. The control section 10 then proceeds with step 206, and inputs the particular key to detect whether or not a pre-set reference period of time T for consecutive inputs has elapsed. The reference period of time T refers to an interval time of key input that is set to be used as a standard for detecting whether or not a particular key is consecutively inputted. According to an embodiment of the present invention, key functions are diversified to perform different functions depending on whether a particular key has been inputted once or consecutively. Thus, the reference time means the time distinguishing a single input from consecutive inputs of a particular key.

If there has been no consecutive key input after elapse of the reference time T following the initial input of the key recognized in the step 204, the control section 10 proceed with step 208 to perform a function corresponding to the inputted key. Otherwise, the control section 10 proceeds with step 210 to detect whether or not the consecutively inputted key is identical to the initially inputted key. If so, the control section 10 proceeds with step 212 to perform the corresponding function newly set according to the consecutive inputs of the key. If not, the process proceeds to step 208.

Figure 3:
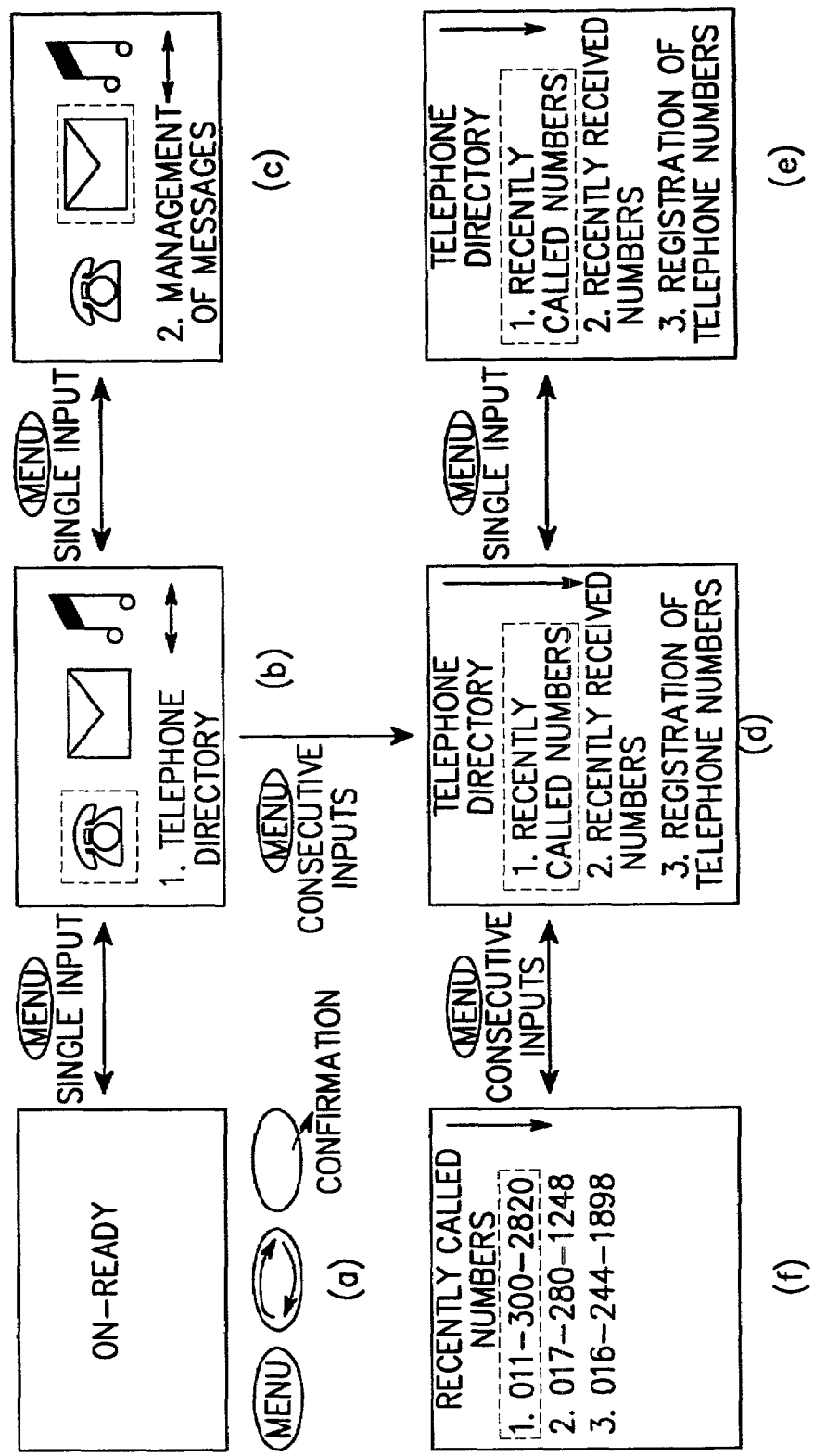
FIG. 3 is an exemplified menu screen of a display section in a mobile telecommunication terminal in accordance with the flow of control in FIG. 2.

FIG. 3 is an exemplified menu screen of a display section in a mobile telecommunication terminal in accordance with the flow of control in FIG. 2. Key operations according to an embodiment of the present invention will now be described in detail with reference to FIG. 3. In particular, the description will be focused on the embodiment of a case when different functions are defined depending on a single or consecutive inputs of a menu key as shown in FIG. 3.

If the user inputs a menu key only once in a short period of time on a menu screen of the initial on-ready state as shown in (a) of FIG. 3, a menu screen is displayed according to the simple input of the menu key as shown in (b) of FIG. 3. In the menu screen shown in (b) of FIG. 3, a selection cursor is positioned at a "phone directory" menu, which is an initial menu icon, among diverse menus appearing on the screen upon a single input of the key. Then, a name of the icon of the corresponding menu is displayed below the icon. At this stage, the user is able to move the selection cursor positioned at one menu icon to another menu icon through a single input of another menu key as shown in (c) of FIG. 3.

However, if a new function has been set to select another menu icon by consecutive inputs of a menu key as in the case of the embodiment of the present invention, the user consecutively inputs the same menu key twice when he/she desires to select the "phone directory" menu icon where the selection cursor is positioned on the menu screen as shown in (b) of FIG. 3.

As a consequence, the display section 80 of the mobile telecommunication terminal displays the contents of the "phone directory" menu icon selected by consecutive inputs of the menu key, as shown in (d) of FIG. 3. The sub-menu screen of the "phone directory" shown in (d) of FIG. 3 is a screen appearing as a result of an input of the conventional menu selection key or of the consecutive menu key inputs as in the case of the embodiment of the present invention. Thus, the selection cursor is positioned at the first corresponding submenu item among diverse "phone directory" sub-menus. For shifting the selection cursor from the "phone directory" sub-menu shown in (d) of FIG. 3 to another sub-menu, the user inputs the menu key once for a short period of time. For viewing the contents of the corresponding sub-menu where the selection is positioned, the user inputs the menu key twice consecutively. In the former case, the screen of the "phone directory" sub-menu, to which the selection cursor has been shifted, is displayed as shown in (e) of FIG. 3. In the latter case, the contents of the recently called number, to which the selection cursor was positioned in (d) of FIG. 3, is displayed as shown in (f) of FIG. 3.

Thus, operation of a new key can be defined with a single or consecutive inputs alone instead of inputs of the functional keys consisting of combination of numerous keys or an additional key for selection of a menu as in case of the conventional devices and methods, thereby diversifying the key functions depending on a key input method in a mobile telecommunication terminal having a limited number of keys.

Figure 4:
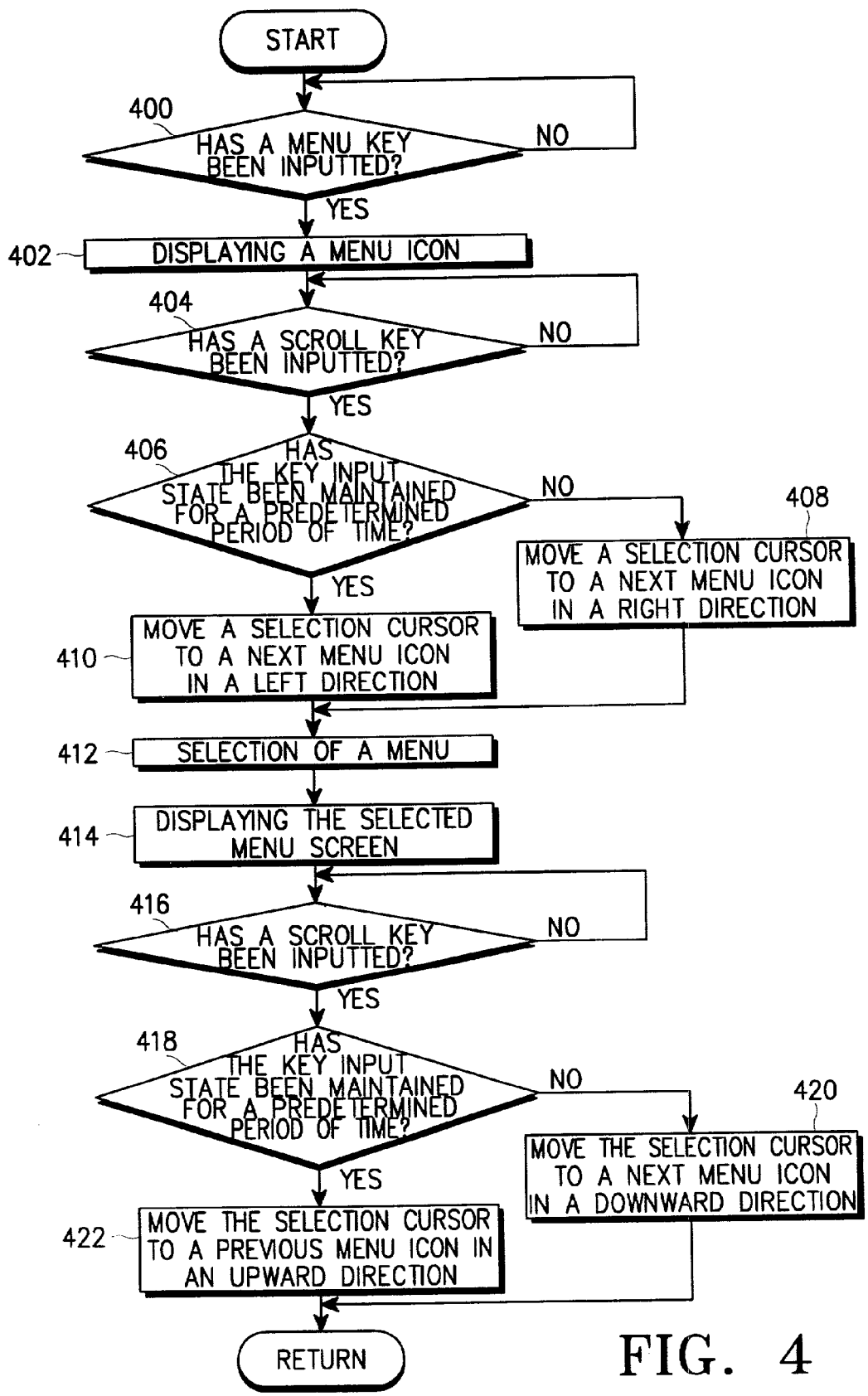
FIG. 4 is a flow chart illustrating a control of key operations depending on a maintenance of a key input state according to an embodiment of the present invention.
Figure 5:
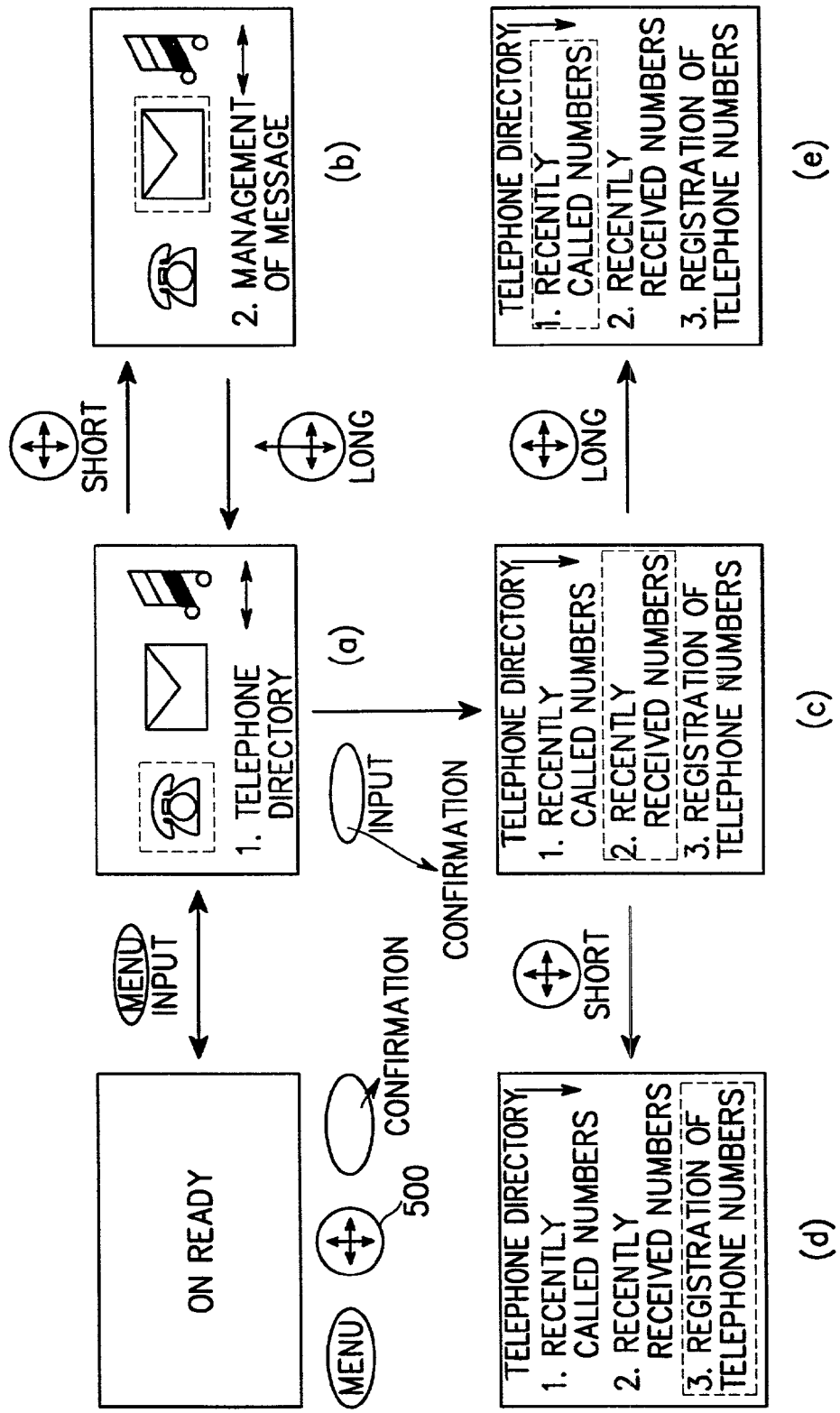
FIG. 5 is an exemplified menu screen of the display section in the mobile telecommunication terminal in accordance with the flow of control in FIG. 4.

FIG. 4 is a flow chart illustrating a control of key operations depending on a maintenance of a key input state according to an embodiment of the present invention. An embodiment of the present invention will now be described in detail with reference to FIGS. 1, 4 and 5.

The user of the mobile telecommunication terminal implements desired functions by manipulating alphanumeric keys or diverse functional keys provided therein. If the user inputs keys for displaying the terminal menus, the control section 10 responds thereto in step 400, and proceeds with step 402 to display the menus provided in the terminal in the form of an icon, as shown in (a) of FIG. 5. The user then inputs at step 404 the keys with a scroll function in left and right directions to move the selection cursor positioned at the menu icon as shown in (a) of FIG. 5 to a desired menu icon. According to the embodiment of the present invention, the key having the scroll function is set such that the selection cursor is moved to the next menu icon either in a left or right direction depending on the period of time for maintaining the key input state on the menu screen comprising the left and right scroll, while the selection cursor is moved to the next menu icon either in downward or in upward direction depending on the period of time for maintaining the key input state on the menu screen comprising an up and down scroll.

The embodiment of the present invention exemplifies a case where a menu screen comprises a left and right scroll. In that case, the selection cursor is moved to the next menu icon in right direction when the scroll key input state is not maintained for a predetermined period of time, while the selection cursor is moved to the next menu icon in left direction when the scroll key input state is maintained for a predetermined period of time. The embodiment of the present invention also exemplifies a case where a menu screen comprises an up and down scroll. In that case, the selection cursor is moved to the next menu icon in downward direction when the scroll key input state is not maintained for a predetermined period of time, while the selection cursor is moved to the next menu icon in upward direction when the scroll key input state is maintained for a predetermined period of time.

Accordingly, in step 404, the control section 10 responds to the case when the user inputs a scroll key 500 to move the selection cursor of the menu screen, and proceeds with step 406 to detect whether or not the scroll key input state is maintained for a predetermined period of time. If not, the control section 10 proceeds with step 408, and moves the selection cursor of the menu icon displayed in the display section 80 of the terminal to the next menu icon in the right direction, as shown in (b) of FIG. 5. If so, the control section 10 proceeds with step 410, and moves the selection cursor as shown in (b) of FIG. 5 to the next menu icon in the left direction. In other words, the user can detect maintenance of the key input state by manipulating a single scroll key provided in the terminal, and can scroll the menu icon in left and right directions. If the selection cursor is positioned at the desired menu icon, the user inputs a confirmation key to select the corresponding menu icon at step 412. The selected menu screen is displayed at step 414.

At step 416, the controller then determines if the scroll key has again been inputted, and if so, proceeds to step 418. At step 418, if the key has been pressed for a predetermined time period, the selection cursor, at step 422, moves in the upward direction. If not, at step 420, the selection cursor moves in a downward direction.

Thus, when selecting a particular menu on a menu screen comprising the conventional scroll or of selecting a particular menu by scroll on a selected menu screen, only a single scroll key is sufficient to scroll according to the present invention unlike the conventional four scroll keys in left, right, upward and downward directions. Therefore, in a mobile telecommunication terminal having limited number of keys, key functions can be diversified according to a key input method.

As described above, the present invention realizes diversification of key functions in a mobile telecommunication terminal having a limited number of keys according to a key input method, thereby providing an advantage of performing various additional operations with limited number of keys.

While the invention has been shown and described with reference to a preferred embodiment, it will be understood by those skilled in the art that various changes in form and detail may be made therein without departing from the spirit and scope of the invention as defined by the appended claims.

What is claimed is:

1. A key input method for diversifying key functions in a mobile telecommunication terminal, comprising:
    detecting whether a user has set a scroll function when displaying a menu screen;
    if so, detecting whether an input state of a key set for a scroll function is maintained for a predetermined period of time; and
    controlling the position of a cursor positioned at a particular item of the displayed menu screen depending on maintenance of the key input state for the predetermined period of time, and when the menu screen comprises a scroll screen of upward and downward directions, the controlling including:
        moving and displaying the cursor of the menu item to a downward menu item when the key input state is not maintained for the predetermined period of time; and
        moving and displaying the cursor of the menu item to an upward menu item when the key input state is maintained for the predetermined period of time.

2. A key input method for diversifying key functions in a mobile telecommunication terminal, comprising:
    detecting whether a user has set a scroll function when displaying a menu screen;
    if so, detecting whether an input state of a key set for a scroll function is maintained for a predetermined period of time; and
    controlling the position of a cursor positioned at a particular item of the displayed menu screen depending on maintenance of the key input state for the predetermined period of time;
    moving and displaying the cursor of the menu item to an upward menu item when the key input state is not maintained for the predetermined period of time; and
    moving and displaying the cursor of the menu item to a downward menu item when the key input state is maintained for the predetermined period of time.

3. A key input method for diversifying key functions in a mobile telecommunication terminal, comprising:
    detecting whether a user has set a scroll function when displaying a menu screen;
    if so, detecting whether an input state of a key set for a scroll function is maintained for a predetermined period of time; and
    controlling the position of a cursor positioned at a particular item of the displayed menu screen depending on maintenance of the key input state for the predetermined period of time, and when the menu screen comprises a scroll screen of left and right directions, the controlling including:
        moving and displaying the cursor of the menu item to a right menu item when the key input state is not maintained for the predetermined period of time; and
        moving and displaying the cursor of the menu item to a left menu item when the key input state is maintained for the predetermined period of time.

4. A key input method for diversifying key functions in a mobile telecommunication terminal, comprising:
    detecting whether a user has set a scroll function when displaying a menu screen;
    if so, detecting whether an input state of a key set for a scroll function is maintained for a predetermined period of time; and
    controlling the position of a cursor positioned at a particular item of the displayed menu screen depending on maintenance of the key input state for the predetermined period of time;
    moving and displaying the cursor of the menu item to a left menu item when the key input state is not maintained for the predetermined period of time; and
    moving and displaying the cursor of the menu item to a right menu item when the key input state is maintained for the predetermined period of time.

* * * * *